: 2,841,619
Patented July 1, 1958

2,841,619

THIO-BIS DIALKYLPHENOLS

Harry E. Albert, Lafayette Hill, Pa., assignor to The Firestone Tire & Rubber Company, Akron, Ohio, a corporation of Ohio No Drawing. Application December 5, 1957
Serial No. 700,753

6 Claims. (Cl. 260—609)

The alkylated thio-bisphenols of this invention are thio-bis(2-alkyl-4-methylphenols), in which the alkyl group is branched chain and contains 4 to 12 carbon atoms. These compounds are outstanding antiozonants and antioxidants in natural rubber. They are superior as antiozonants to the corresponding disulfides and also to the monosulfides substituted in other positions in the phenol rings. When used in rubber they do not discolor the rubber as their lower homologs do.

The preferred compounds are:

Thio-bis(2-t-butyl-4-methylphenol).
Thio-bis(2-sec-butyl-4-methylphenol).
Thio-bis(2-t-amyl-4-methylphenol).
Thio-bis(2-tt-octyl-4-methylphenol).
Thio-bis(2-nonyl-4-methylphenol) in which the nonyl group is a mixture of secondary and tertiary alkyl radicals.

These compounds are, generally speaking, more readily available commercially than compounds such as the following which are included in the invention and are non-discoloring when used in rubber. They are substantially equally as effective as antiozonants as the foregoing preferred compounds.

Thio-bis(2-sec-amyl-4-methylphenol).
Thio-bis(2-sec-hexyl-4-methylphenol).
Thio-bis(2-t-hexyl-4-methylphenol).
Thio-bis(2-sec-nonyl-4-methylphenol).
Thio-bis(2-dodecyl-4-methylphenol) in which the dodecyl group is a mixture of secondary and tertiary alkyl radicals.

Regarding the foregoing nonyl and dodecyl derivatives it is noted that mixed nonenes are derived from petroleum cracking or, more likely, from propylene trimers; mixed dodecenes are derived from propylene tetramers and isobutylene trimers. Although these alkenes are of all possible structures, the alkyl groups derived from them by alkylation are all secondary or tertiary alkyl groups.

The following examples illustrate the preparation of the new compounds.

EXAMPLE 1

*Thio-bis(2-tt-octyl-4-methylphenol)*

To 324 grams (3 moles) of p-cresol (practical grade obtained from Eastman Kodak Company), 13 grams of concentrated sulfuric acid was added. The temperature rose from 27 to 31° C. Then 336 grams of diisobutylene was added at 25–30° C. over a one and one-quarter hour period, with external cooling by means of a water bath. An additional 6.5 grams of concentrated sulfuric acid was added and the mixture was stirred at 25–30° C. for 2¾ hours. Then, while stirring, 300 ml. of warm water was added, and an emulsion formed. This was heated to 80° C. and transferred to a separatory funnel. Separation was almost complete in 1 hour. A few grams of sodium chloride were added, and the mixture was allowed to stand to complete the separation. After the addition of 1.8 grams of sodium sulfite and 9 grams of anhydrous sodium carbonate, the organic layer was distilled under reduced pressure. The fore-run of 115 grams distilled over up to 144° C./10 mm.; 465 grams of 2-tt-octyl-4-methylphenol distilled over at 144° C./10 mm. to 146° C./10 mm.; 27 grams of higher boiling material distilled over at 146° C./10 mm. to 180° C./5 mm., mostly at the latter temperature. The tt-octyl group is sometimes referred to as the 2,2,4,4-tetramethylbutyl group.

Twenty-two grams (0.1 mole) of 2-tt-octyl-4-methylphenol in 100 ml. of carbon tetrachloride was treated with 5.1 grams (0.05 mole) of sulfur dichloride in 50 ml. of carbon tetrachloride at room temperature over the weekend to give a very viscous residue a portion of which was crystallized from acetic acid-water to give seed crystals with which the main portion of the product was crystallized from petroleum ether. The yield was 13.1 grams with melting point of 95–100° C. which on recrystallization from petroleum ether gave 8.3 grams with melting point of 103–104° C. A small portion of this was recrystallized from methanol to give a product with melting point of 104.5–105.5° C.

*Analysis.*—Calculated for $C_{30}H_{46}SO_2$: S=6.81%; C=76.50%; H=9.85%. Found: S=6.69%, 6.94%; C=75.74%, 75.91%; H=9.99%, 9.88%.

The compound was thio-bis(tt-octyl-4-methylphenol).

EXAMPLE 2

*Thio-bis(2-t-butyl-4-methylphenol)*

To 131.2 grams (0.8 mole) of 2-t-butyl-4-methylphenol in 200 ml. of carbon tetrachloride there was added during a period of one hour, 41.2 grams (0.4 mole) of sulfur dichloride in 50 ml. of carbon tetrachloride. This was refluxed to remove HCl. The solvent was evaporated off and the residue was taken up in petroleum ether. Product was precipitated by cooling the vessel in frozen $CO_2$-acetone. The yield was 67.2 grams with melting point of 80–82° C. On recrystallization from petroleum ether 52 grams of product with melting point of 83–84° C. was obtained.

*Analysis.*—Calculated for $C_{22}H_{30}SO_2$: S=8.94%; C=73.70%; H=8.44%. Found: S=8.82%, 8.93%; C=73.59%, 73.36%; H=8.60%, 8.84%.

The compound was thio-bis(2-t-butyl-4-methylphenol.)

EXAMPLE 3

*Thio-bis(2-t-amyl-4-methylphenol)*

One hundred and eight grams of p-cresol and 5.4 grams of stannic chloride were placed in a flask and heated to 50° C. with stirring. During 1 hour and 10 minutes there was added dropwise to this mixture, 111.8 grams of t-amyl chloride. The mixture was stirred continuously. During the first 20 minutes of the addition, the temperature rose from 50 to 70° C. This latter temperature was then maintained during the remainder of the reaction time. Copious amounts of hydrogen chloride were evolved. This temperature was maintained and stirring was continued for another 3 hours. The reaction mixture was then cooled to room temperature during 2 hours. The mixture was diluted with petroleum ether and then washed with a solution of hydrogen chloride (50 ml. of concentrated HCl diluted with 200 ml. of $H_2O$), then with sodium hydroxide (100 ml. of NaOH diluted with 100 ml. of water) and finally with water. The mixture was dried over anhydrous sodium sulfate over night. Then 3 grams of anhydrous sodium carbonate and 0.6 gram of sodium sulfite were added and the product was distilled under reduced pressure. It gave a fore-fraction of 21 grams, and then 70.3 grams of 2-t-amyl-4- methylphenol, with boiling range of 135–139° C. at 20 mm.

Twenty five grams of the phenol were placed in a 500-ml. flask and dissolved in 100 ml. of n-hexane. The mixture was stirred at 25° C. while adding 26 grams of sulfur dichloride dropwise during 15 minutes. The mixture was stirred for an additional 3 hours at 25° C. The solvent was removed at a low temperature and reduced pressure. The last traces of solvent were removed by heating the residue to 80 to 85° C. for 2 to 3 minutes. The resulting yellow, viscous liquid weighed 24.3 grams. It was thio-bis(2-t-amyl-4-methylphenol).

EXAMPLE 4

*Thio-bis(2-sec-butyl-4-methylphenol)*

Two hundred sixteen grams (2 moles) of p-cresol and 10 grams of concentrated sulfuric acid were stirred together vigorously. Then, butene-1 was bubbled into the mixture for 3 hours. Ten grams of concentrated sulfuric acid were added and bubbling continued for an additional 2 hours. There was a total gain in weight of 100 grams. The reaction mixture was washed with water and then filtered through glass wool having some anhydrous potassium carbonate on top of it. Then the reaction mixture was distilled under reduced pressure from a flask containing anhydrous potassium carbonate. There was 95 grams of a fore-fraction, up to 129° C./20 mm.; then 140 grams of product was obtained above 129° C./20 mm., which was redistilled. There was a 2-gram fore-fraction up to 130° C./20 mm.; then 66 grams of 2-sec-butyl-4-methylphenol at 130–135° C./20 mm.; and 67 grams of higher boiling material.

Twenty five grams of the phenol was dissolved in 100 ml. of n-hexane and 50 ml. of ethylene dichloride. During 20 minutes, 8.2 grams of sulfur dichloride was added at 27–29° C., with stirring. Copious amounts of hydrogen chloride were evolved. The mixture was stirred at room temperature for an additional 5 hours. Ten milliliters of methanol were added and stirring was continued for 10 minutes. The volatiles were removed at reduced pressure, yielding 28 grams of clear, brown, fairly mobile liquid. It was thio-bis(2-sec-butyl-4-methylphenol).

EXAMPLE 5

*Thio-bis(2-mixed sec- and t-nonyl-4-methylphenols)*

One hundred seventy eight grams of p-cresol was placed in a flask with 7.3 grams of concentrated sulfuric acid, and the mixture was cooled to 25–7° C. by external cooling. During 1 hour and 10 minutes there was added to this mixture 208 grams of redistilled mixed nonenes. An additional 3.6 grams of concentrated sulfuric acid was added and stirring was continued at room temperature for an additional 2 hours. Then 190 ml. of water was added, and the mixture was stirred while being heated to 80° C. The hot solution was placed in a separatory funnel and allowed to separate for 1 hour. The water was removed and 6 grams of anhydrous sodium carbonate and 1.2 grams of sodium sulfite were added to the organic layer, and it was distilled under reduced pressure. The fraction of 146.6 grams which distilled at 155–159° C./10 mm. was collected as 2-mixed secondary- and tertiarynonyl-4-methylphenols.

Then 23.4 grams of the phenol mixture was dissolved in 100 ml. of n-hexane, and the mixture placed in a 500-ml. flask. During 15 minutes, 5.4 grams of sulfur dichloride was added with stirring at 25° C. After the addition, the mixture was stirred for 3½ hours, and then 10 ml. of methanol was added (to react with excess sulfur dichloride present). The solvent was removed at reduced pressure, and the last traces were removed by heating to 80 to 85° C. for a few minutes at reduced pressure. A dark brown, clear, viscous liquid resulted which weighed 23.7 grams. It was thio-bis(2-sec- and t-nonyl-4-methylphenols).

EXAMPLE 6

*Thio-bis(2-mixed sec- and t-dodecyl-4-methylphenols)*

Two hundred sixteen grams of p-cresol was placed in a flask with 8.8 grams of concentrated sulfuric acid. The mixture was heated to 50–52° C. While stirring, 336 grams of propylene tetramer was added dropwise during 1 hour and 10 minutes while the foregoing temperature range was maintained with external heating. Then 4.4 grams of concentrated sulfuric acid was added and heating and stirring were continued for another two hours. The reaction mixture was then cooled during the next hour. Then while heating to 80° C., 190 ml. of water was added with stirring. The mixture was placed in a separatory funnel, and the water was removed. To the organic layer, 6 grams sodium carbonate (anhydrous) and 1.2 grams sodium sulfite were added, and then the dried organic layer was distilled. The fraction distilling at 180 to 190° C. at 10 mm. was a mixture of 2-sec- and t-dodecyl-4-methylphenols.

Then 27.6 grams of this phenol mixture was dissolved in 100 ml. n-hexane and stirred at 25° C. During 15 minutes, 5.4 grams of sulfur dichloride was added dropwise, with stirring at 25° C. The mixture was stirred at this temperature an additional two hours, and then 10 ml. of methanol was added and the stirring was continued 10 minutes. The solvent was removed at reduced pressure, the last traces being removed by heating to 80 to 85° C. for a few minutes under reduced pressure. The clear, dark, viscous residue weighed 27.5 grams. It was thio-bis(2-sec- and t-dodecyl-4-methylphenols).

This application is a continuation-in-part of application Serial No. 400,341, filed December 24, 1953.

What I claim is:

1. Thio-bis-dialkyl phenols of the class consisting of thio-bis(2-alkyl-4-methylphenols) in which the alkyl group contains 4 to 12 carbon atoms and is from the class which consists of secondary and tertiary alkyl groups.
2. Thio-bis(2-t-butyl-4-methylphenol).
3. Thio-bis(2-sec-butyl-4-methylphenol).
4. Thio-bis(2-t-amyl-4-methylphenol).
5. Thio-bis(2-tt-octyl-4-methylphenol).
6. Thio-bis(2-nonyl-4-methylphenol)s selected from the group consisting of thio-bis(2-sec-nonyl-4-methylphenol) and thio-bis(2-t-nonyl-4-methylphenol).

References Cited in the file of this patent

UNITED STATES PATENTS

| | | |
|---|---|---|
| 2,270,183 | Cook | Jan. 13, 1942 |
| 2,364,338 | Beaver | Dec. 5, 1944 |
| 2,370,756 | Sibley | Mar. 6, 1945 |
| 2,459,754 | Albert | Jan. 18, 1949 |